United States Patent
Lu et al.

(10) Patent No.: US 6,709,120 B2
(45) Date of Patent: Mar. 23, 2004

(54) FLASH UNIT FOR A CAMERA

(75) Inventors: Cheng-Hsien Lu, Taipei Hsien (TW); Jih-Yung Lu, Taipei Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/052,728

(22) Filed: Jan. 18, 2002

(65) Prior Publication Data

US 2002/0085365 A1 Jul. 4, 2002

(30) Foreign Application Priority Data

Mar. 1, 2001 (TW) .................................. 90203034 U

(51) Int. Cl.$^7$ ................................................ F21V 19/00
(52) U.S. Cl. ........................... 362/16; 396/176; 362/17; 362/3
(58) Field of Search ................. 362/3, 16, 17; 396/176, 199, 200

(56) References Cited

U.S. PATENT DOCUMENTS

| | | | | | |
|---|---|---|---|---|---|
| 4,317,625 | A | * | 3/1982 | Van Allen | 354/145 |
| 4,412,276 | A | * | 10/1983 | Blinow | 362/278 |
| 4,460,942 | A | * | 7/1984 | Puzzuti et al. | 362/217 |
| 6,337,953 | B1 | * | 1/2002 | Nakanishi et al. | 396/176 |

* cited by examiner

Primary Examiner—Laura K. Tso
(74) Attorney, Agent, or Firm—Ladas & Parry

(57) ABSTRACT

A flash unit for a camera comprises a bracket, a reflecting member, two fixed members and a flash emission tube. The bracket is disposed inside the camera, and the reflecting member is disposed inside the bracket. The fixed members are integrally formed on the bracket, and the flash emission tube is fixedly disposed inside the bracket by the fixed members. By integrally forming the fixed members on the bracket, the conventional rubber band for fixing the emission tube can be replaced. Since the number of the consisting elements of the flash unit are thereby reduced, its cost can also be reduced. In addition, assembly time can also be reduced.

11 Claims, 5 Drawing Sheets

30

30

FLASH UNIT FOR A CAMERA

BACKGROUND OF THE INVENTION

1. Field of the Invention

The invention relates to a flash unit for a camera; in particular, the invention relates to a flash unit with reduced production costs and assembly time.

2. Description of the Related Art

Conventional and digital cameras use auxiliary artificial light sources to increase the brightness when taking a picture at night, in the evening, or inside a dimly lit room. As a result, a flash unit is a necessary unit for a camera. In a professional camera or a traditional single-lens reflex camera, the flash unit is separated off the camera body. However, for most automatic and digital cameras, the flash unit is integrated with the camera body.

FIG. 1 is a schematic elevation view of a camera 100. In FIG. 1, the camera 100 has a main body 1 and a lens 3. The main body 1 has a viewfinder 2 for viewing the subject. The flash unit 10 is positioned on the upper left corner on the front of the main body 1. Additionally, a shutter release button 5 is on the upper of the body 1, to control the operation of the lens 3 and the shutter (not shown) inside the body 1. In a dim light environment, the flash unit 10 works automatically to enhance brightness.

A conventional flash unit 10 is shown in FIG. 2a, FIG. 2b, FIG. 2c, FIG. 2d and FIG. 2e, and it is disposed at a predetermined position on the camera 100 by an unillustrated locating device, such as a bolt and a bolt hole.

Referring to FIG. 2a, FIG. 2b, FIG. 2c, FIG. 2d and FIG. 2e, the conventional flash unit 10 consists of a bracket 11, a reflecting member 12, a flash emission tube 13, and a rubber band 14 for fixing the flash emission tube 13.

The bracket 11 is disposed at a predetermined position inside the camera 100 by the unillustrated locating device, and is provided with two through holes 111 in both sidewalls. The reflecting member 12, disposed inside the bracket 11, is used to enhance the brightness of the flash emission tube 13. The flash emission tube 13 is a main source of the artificial light.

The steps of mounting the flash emission tube 13 into the bracket 11 follow. First, the flash emission tube 13 passes through the through holes 111. Then, the rubber band 14 fixes the flash emission tube 13 at the predetermined position of the bracket 11.

As stated above, after the flash emission tube 13 passes through the through holes 111, another element is required to fix the flash emission tube 13 at the bracket 11. Hence, assembly time is inflated, as are production costs.

Furthermore, as shown in FIG. 2b, since both ends of the flash emission tube 13 are soldered to two wires 15, 15; the mounting of the flash emission tube 13 is more difficult. Specifically, since the wire 15 with a certain length is soldered to the flash emission tube 13 before the flash emission tube 13 passes through the through holes 111, it is more difficult to assemble the flash emission tube 13, with the wire 15, to the bracket 11 by the rubber band 14.

In addition to the rubber band 14, there are other devices to assemble the flash emission tube 13 to the bracket 11. However, the assembling steps of these devices are the same as the assembly steps of the rubber band 14. Also, these devices increase the whole cost of the flash unit.

SUMMARY OF THE INVENTION

In view of the disadvantages of the aforementioned conventional flash unit, the invention provides a flash unit with reduced production costs and assembly time.

Accordingly, the invention provides a flash unit. It comprises a bracket, a reflecting member, two fixed members and a flash emission tube. The bracket is disposed inside the camera, and the reflecting member is disposed inside the bracket. The fixed members are integrally formed on the bracket to fix the flash emission tube inside the bracket.

The fixed members are made of a flexible material, preferably, the bracket and the fixed members are made of plastic.

The bracket is provided with two through holes adjacent to the fixed members separately, and an area of the through hole defined by the corresponding fixed member is smaller than a cross-section area of the flash emission tube passing through the through hole.

The invention also provides another flash unit. It comprises a bracket, a reflecting member, a fixed member and a flash emission tube. The bracket is disposed inside the camera, and the reflecting member is disposed inside the bracket. The fixed member is integrally formed on the bracket to fix the flash emission tube inside the bracket.

The bracket is provided with a receiving portion, located opposite the fixed member.

The invention also provides another flash unit. It comprises a bracket, a reflecting member and a flash emission tube. The bracket, having two holders, is disposed inside the camera. The reflecting member is disposed inside the bracket, and the flash emission tube is fixedly disposed inside the bracket by the holders.

BRIEF DESCRIPTION OF THE DRAWINGS

The invention is hereinafter described in detail by reference to the accompanying drawings in which.

DETAILED DESCRIPTION OF THE INVENTION

First Embodiment

Referring to FIG. 3a, FIG. 3b, FIG. 3c, FIG. 3d and FIG. 3e, a flash unit 20 of a first embodiment of this invention comprises a bracket 21, a reflecting member 22 and a flash emission tube 23.

Figure 1:
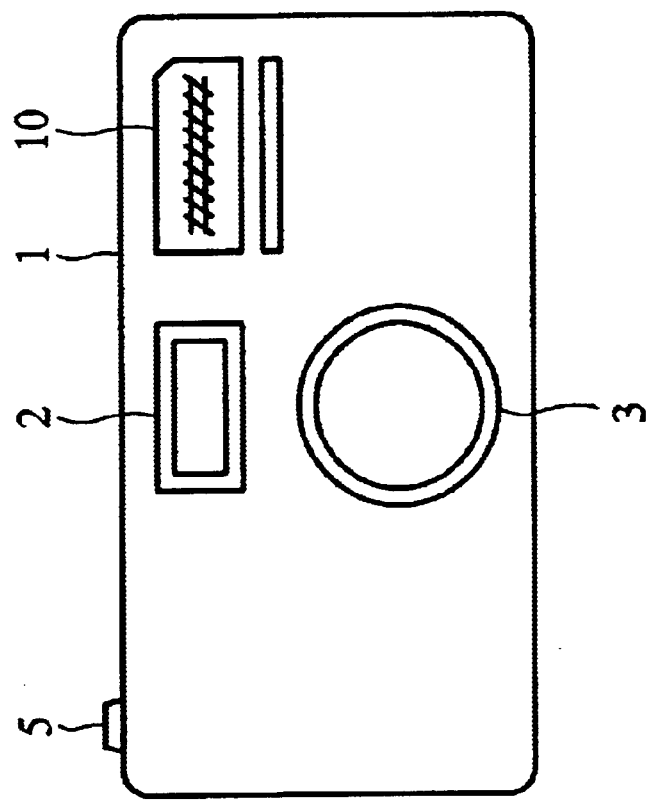
FIG. 1 is a schematic view depicting a camera.
Figure 2B:
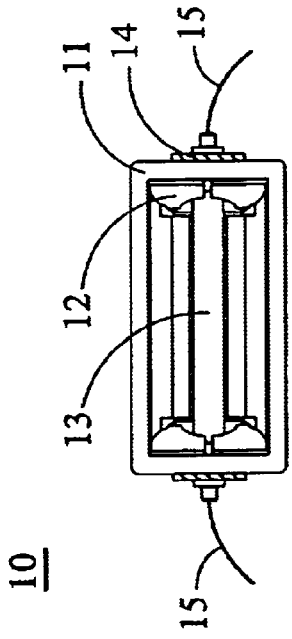
FIG. 2b is a front view depicting a conventional flash unit.
Figure 2A:
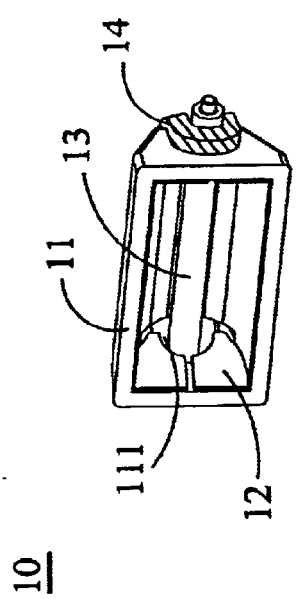
FIG. 2a is a perspective view depicting a conventional flash unit.
Figure 2E:
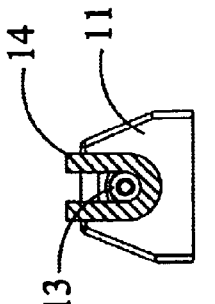
FIG. 2e is a side view depicting a conventional flash unit.
Figure 2D:
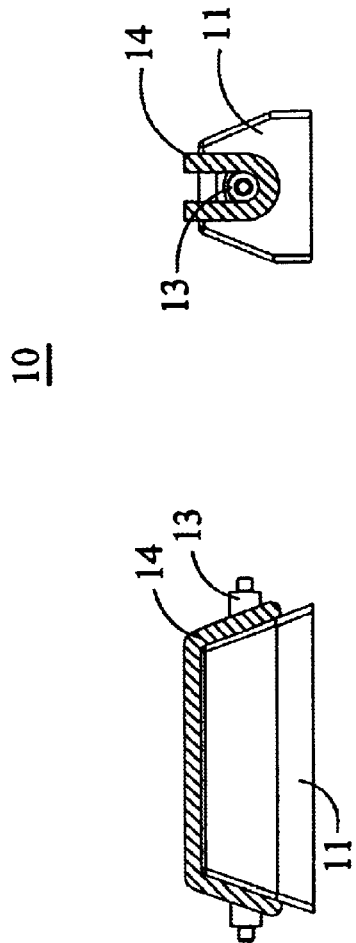
FIG. 2d is a top view depicting a conventional flash unit.
Figure 2C:
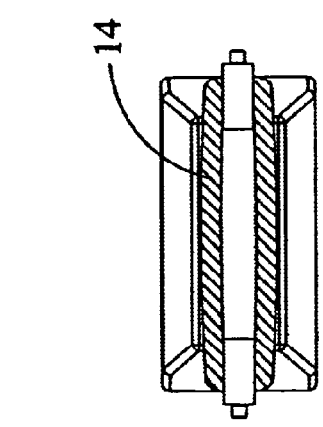
FIG. 2c is a rear view depicting a conventional flash unit.
Figure 3B:
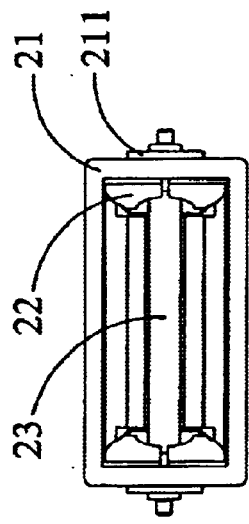
FIG. 3b is a front view depicting the flash unit of the first embodiment of this invention.
Figure 3A:
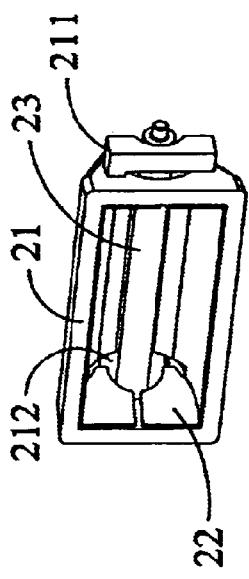
FIG. 3a is a perspective view depicting a flash unit of a first embodiment of this invention.
Figure 3E:
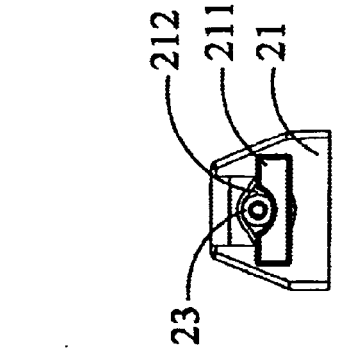
FIG. 3e is a side view depicting the flash unit of the first embodiment of this invention.
Figure 3D:
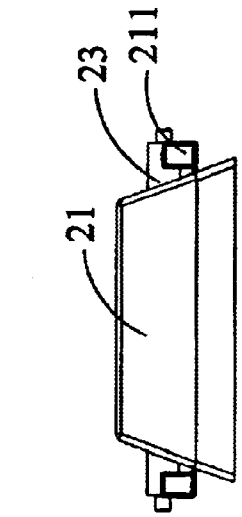
FIG. 3d is a top view depicting the flash unit of the first embodiment of this invention.
Figure 3C:
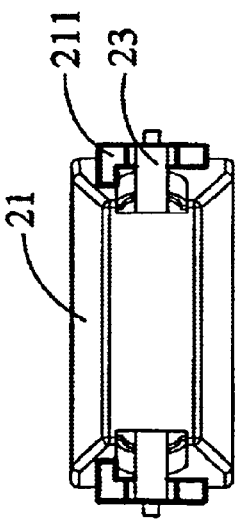
FIG. 3c is a rear view depicting the f lash unit of the first embodiment of this invention.

The bracket 21 is disposed at a predetermined position inside the camera 100 by an unillustrated locating device, and it is provided with two through holes 212 in the left and right sidewalls, as shown in FIG. 3b. The reflecting member 22, disposed inside the bracket 21, is used to enhance the brightness of the flash emission tube 23. The flash emission tube 23 is a main source of the artificial light.

It is noted that two fixed members 211 are integrally formed on the sidewalls, with the through holes 212 of the bracket 21 separately. The fixed members 211 are made of a flexible material, such as plastic. An area of the through hole 212 defined by the corresponding fixed member 212 is smaller than a cross-section area of the flash emission tube 23 passing through the through hole 212. However, since the fixed members 211 are made of a flexible material, the flash emission tube 23 can pass through the area of the through hole 212 defined by the corresponding fixed member 212 by bending the fixed members 211. Also, since the fixed members 211 are made of a flexible material, the flash emission tube 23, passing through the through hole 212, can be fixed on the bracket 21 by the elastic force of the fixed members 211.

As a result, in this embodiment, the fixed members 211, integrally formed on the bracket 21, replace the conventional rubber band; therefore, both the cost and assembly time can be reduced.

Second Embodiment

Figure 4A:
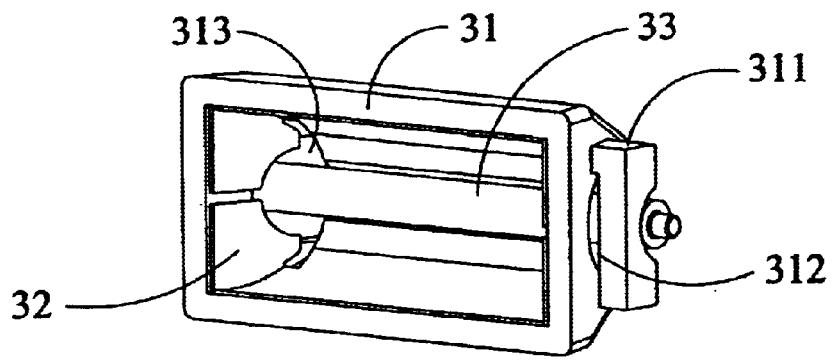
FIG. 4a is a perspective view depicting a flash unit of second embodiment of this invention.
Figure 4B:
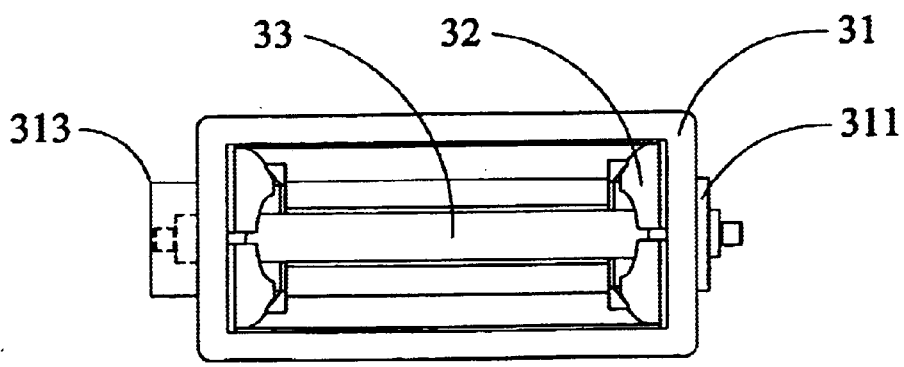
FIG. 4b is a front view depicting the flash unit of the second embodiment of this invention.

Referring to FIG. 4a and FIG. 4b, a flash unit 30 of a second embodiment of this invention comprises a bracket 31, a reflecting member 32, a flash emission tube 33, a fixed member 311 and a through hole 312. In this embodiment, since the construction and the assembling manner of the above members are the same with the first embodiment, their description is omitted.

The difference between the first embodiment and the second embodiment is that in this embodiment, a receiving portion 313 is formed on one side of the bracket 313 to replace one through hole and one fixed member of the first embodiment.

Hence, in this embodiment, one end of the flash emission tube 33 is received inside the receiving portion 313 after it passes through the fixed member 311 and the through hole 312, while another end of flash emission tube 33 is fixed by the fixed member 311. As a result, the flash emission tube 33 is easily mounted inside the bracket 31.

Third Embodiment

Figure 5A:
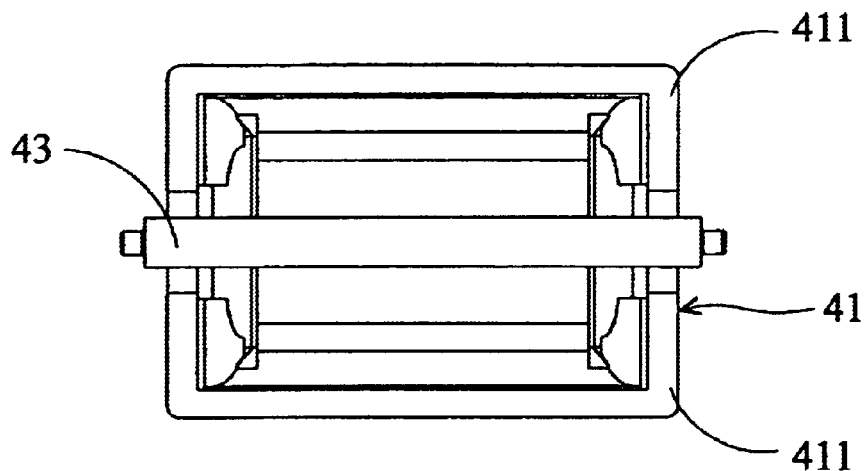
FIG. 5a is a perspective view depicting a flash unit of a third embodiment of this invention, wherein two holders separate.
Figure 5B:
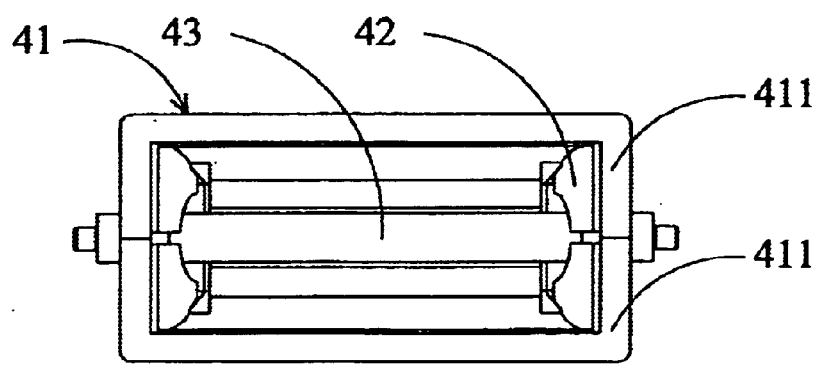
FIG. 5b is a front view depicting the flash unit of the third embodiment of this invention, wherein two holders abut each other.

Referring to FIG. 5a and FIG. 5b, a flash unit 40 of a third embodiment of this invention comprises a bracket 41, a reflecting member 42 and a flash emission tube 43. In this embodiment, since the construction and the assembling manner of the above members are the same with the first embodiment, their description is omitted.

The difference between the first embodiment and the third embodiment is that in this embodiment, the bracket 41 is provided with two holders 411 to clamp the flash emission tube 43.

Hence, in this embodiment, the flash emission tube 43 is easily mounted inside the bracket 41 by the clamping of the holders 411.

While the invention has been particularly shown and described with reference to a preferred embodiment, it will be readily appreciated by those of ordinary skill in the art that various changes and modifications may be made without departing from the spirit and scope of the invention. It is intended that is the claims be interpreted to cover the disclosed embodiment, those alternatives which have been discussed above, and all equivalents thereto.

What is claimed is:

1. A flash unit for a camera, comprising:
   a bracket disposed inside the camera;
   a reflecting member disposed inside the bracket;
   two fixed members integrally formed on the bracket; and
   a flash emission tube installed by bending the fixed members and fixed on the bracket by the elastic force of the fixed members.

2. The flash unit as claimed in claim 1, wherein the fixed members are made of a flexible material.

3. The flash unit as claimed in claim 2, wherein the bracket and the fixed members are made of plastic.

4. The flash unit as claimed in claim 3, wherein the bracket is provided with two through holes adjacent to the fixed members separately, and an area of the through hole defined by the corresponding fixed member is smaller than a cross-section area of the flash emission tube passing through the through hole.

5. A flash unit for a camera, comprising:
   a bracket disposed inside the camera;
   a reflecting member disposed in side the bracket;
   a fixed member integrally formed on the bracket; and
   a flash emission tube installed by bending the fixed member and fixed on the bracket by the elastic force of the fixed member.

6. The flash unit as claimed in claim 5, wherein the bracket is provided with a receiving portion, formed opposite the fixed member.

7. The flash unit as claimed in claim 6, wherein the fixed member is made of a flexible material.

8. The flash unit as claimed in claim 7, wherein the bracket and the fixed member are made of plastic.

9. The flash unit as claimed in claim 8, wherein the bracket is provided with a through hole adjacent to the fixed member, and an area of the through hole defined by the fixed member is smaller than a cross-section area of the flash emission tube passing through the through hole.

10. A flash unit for a camera, comprising:
    a bracket, having two holders, disposed inside the camera;
    a reflecting member disposed inside the bracket; and
    a flash emission mounted inside the bracket by clamping of the holders.

11. The flash unit as claimed in claim 6, wherein one end of the flash emission tube is received inside the receiving portion, and the other end of the flash emission tube is fixed on the bracket by the fixed member.

* * * * *